J. H. PLOEHN.
LAP WELD AND METHOD OF PRODUCING SAME.
APPLICATION FILED JULY 6, 1916.

1,252,025.

Patented Jan. 1, 1918.

Attest:

Inventor:
J. H. Ploehn
by Rogers, Kennedy & Campbell
Attys

UNITED STATES PATENT OFFICE.

JOHN H. PLOEHN, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

LAP-WELD AND METHOD OF PRODUCING SAME.

1,252,025.  Specification of Letters Patent.  Patented Jan. 1, 1918.

Application filed July 6, 1916. Serial No. 107,747.

*To all whom it may concern:*

Be it known that I, JOHN H. PLOEHN, a citizen of the United States, residing at Davenport, in the county of Scott and State of Iowa, have invented certain new and useful Improvements in Lap-Welds and Methods of Producing Same, of which the following is a specification, reference being had therein to the accompanying drawing.

This invention relates to the method of welding and is applicable more particularly to the lap welding of sheets, plates, wheel rims and the like.

In lap welding wide sheets or plates under the commonly practised methods, difficulty is encountered in producing a smooth and uniform union of the parts, which difficulty increases as the width of the plates increases. It is the common practice in welding such wide plates, to effect the weld in two operations, successively on opposite sides of the center. This operation results in a distorted or uneven portion at the termination of the first weld, and when the second weld is effected a further unevenness and distortion takes place, the result of which is the production of an objectionable and uneven union, with the double thickness of the metal of the weld unevenly distributed, and the weld in many cases much thicker at the center than at the sides.

It is the aim of my invention to avoid this objectionable action and to effect a welded union of the parts which will be even and regular and of uniform thickness throughout, and with this end in view my invention consists in so controlling the flow of the metal under the welding pressure, that the double thickness of the overlap will be permitted to be distributed without causing distorted or uneven portions in the weld. Such control of the flow of the metal may be brought about by forming in one or both of the ends of the parts to be joined, a relief cavity or cavities in which the metal under the action of the welding pressure, will be displaced and thereby controlled in its flow and distributed evenly throughout the weld.

The invention also consists in the improved union or weld resulting from said method.

Figure 1:
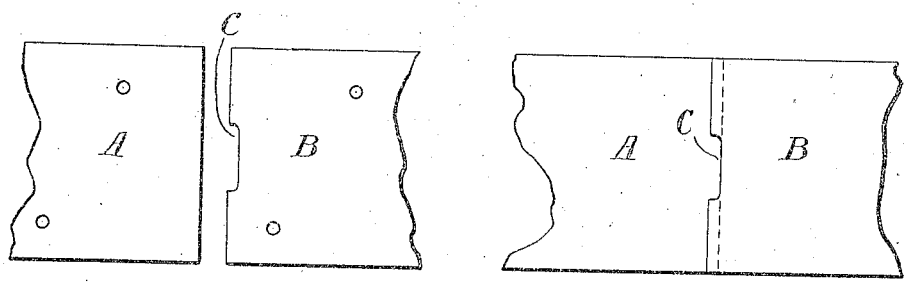
Figure 1 is a plan view of the terminal portions of two plates to be welded, these plates in the present case being the ends of a wheel rim, and one of the ends being provided with a relief cavity.
Figure 2:
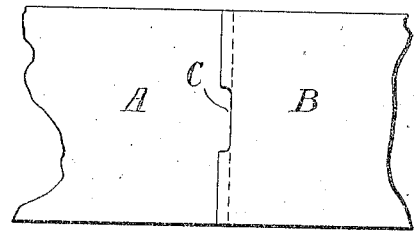
Fig. 2 is a similar view showing the ends overlapped preparatory to the welding operation.
Figure 3:
Fig. 3 is a side elevation of the same.
Figure 4:
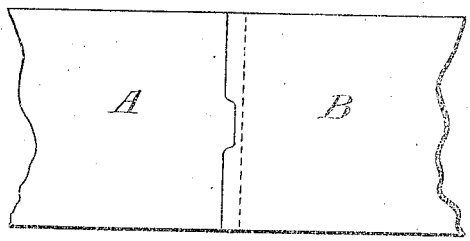
Fig. 4 is a plan view showing the completed weld.
Figure 5:
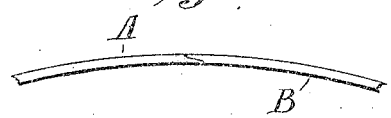
Fig. 5 is a side elevation of the same.

In carrying my method into practice, one of the two rim ends A and B as shown in Fig. 1 is provided near its central portion with a relief cavity C, and the two ends are overlapped as shown in Fig. 2 and are then, after being previously heated to a welding temperature, subjected by suitable means to a welding pressure to cause the overlapping ends to be welded together and united. The result of the welding pressure will be to reduce the thickness of the metal of the joint, which metal will be caused to flow inwardly toward the relief cavity and be distributed and displaced therein, resulting in a welded joint of uniform thickness as shown in Fig. 5, the relief cavity being contracted as shown in Fig. 4 due to the displacement and flow of the metal therein.

By the provision of the relief cavity, the line of weld is divided so as to produce in effect two welds, each of comparatively limited extent, the presence of the relief cavity enabling the double thickness of metal due to the overlapping ends, to be controlled in its flow and distributed evenly, thereby avoiding any objectionable accumulation or unevenness at the center, and producing a weld with the metal evenly distributed throughout. A smoother and better joint may therefore be formed with correspondingly reduced labor. The welding pressure to unite the parts, may be applied throughout the width of the plates in one operation, but it is preferable to effect the operation in two steps, first on one side of the cavity and then on the other side.

Figure 6:
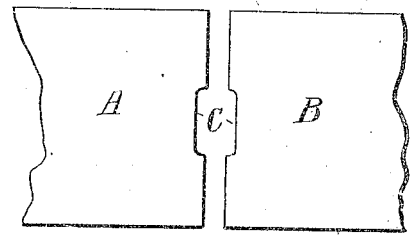
Fig. 6 is a plan view similar to Fig. 1 but showing a relief cavity in each of the rim ends.

As shown in Fig. 6 the relief cavity may be formed in both of the ends instead of in only one as shown in Fig. 1.

While I have illustrated my invention as applicable to the welding of the ends of metal wheel rims, it will be understood that it is not restricted in this connection and may be applied for joining plates or sheets and other parts; and it will be further understood that the invention is not limited, either in respect to the method or the article produced thereby, except in so far as such limitations are specified in the claims.

Having thus described my invention, what I claim is:

1. The method of welding the ends of sheets or plates, which consists in bringing the same into welding relations to each other, subjecting said ends, previously heated, to a welding operation to cause the metal to flow and unite said ends, and controlling said flow of the metal to evenly distribute the same in the weld.

2. The method of lap welding the ends of sheets or plates, which consists in forming in one of the ends to be welded a relief cavity to control the flow of the metal of the weld, overlapping said ends, and subjecting the overlapping ends, previously heated, to a welding pressure to unite them.

3. The method of lap welding the ends of sheets or plates, which consists in forming in one of the ends to be welded a relief cavity to control the flow of the metal of the weld, overlapping said ends, and subjecting the overlapping ends at opposite sides of the relief cavity, while heated, successively to welding pressures to unite them.

4. The method of lap welding the ends of sheets or plates, which consists in forming relief cavities in the ends to be welded to control the flow of the metal of the weld, overlapping said ends, and applying to the overlapping ends, while heated, a welding pressure to unite them.

5. The method of lap welding wheel rims, which consists in forming a relief cavity in one of the ends to be welded to control the flow of the metal of the weld, overlapping the ends of the rim, and subjecting the overlapping ends, previously heated, to a welding pressure to unite them.

6. A lap weld union having a relief cavity in which the metal of the weld is distributed.

7. A wheel rim having its ends overlapped and welded together and provided with a cavity in which the metal of the weld is distributed.

In testimony whereof, I have affixed my signature in presence of two witnesses.

JOHN H. PLOEHN.

Witnesses:
ANDREW NEILSON,
S. L. SAMPLE.